Nov. 19, 1968  H. J. SCHELLSTEDE  3,411,837
DRILL PIPE PROTECTOR
Filed Nov. 28, 1966  2 Sheets-Sheet 2
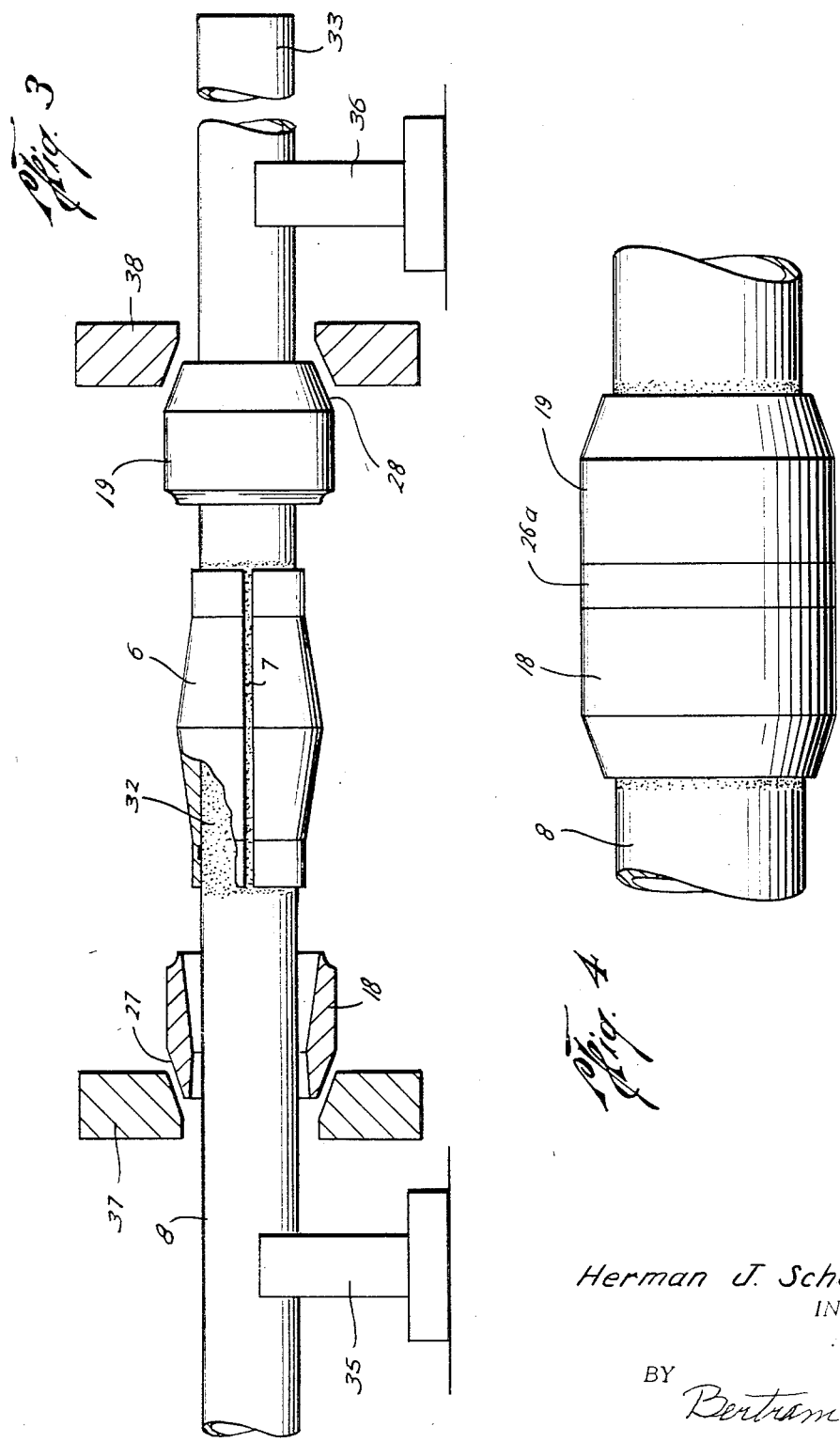
Herman J. Schellstede
INVENTOR.
BY Bertram H Mann
ATTORNEY // # United States Patent Office

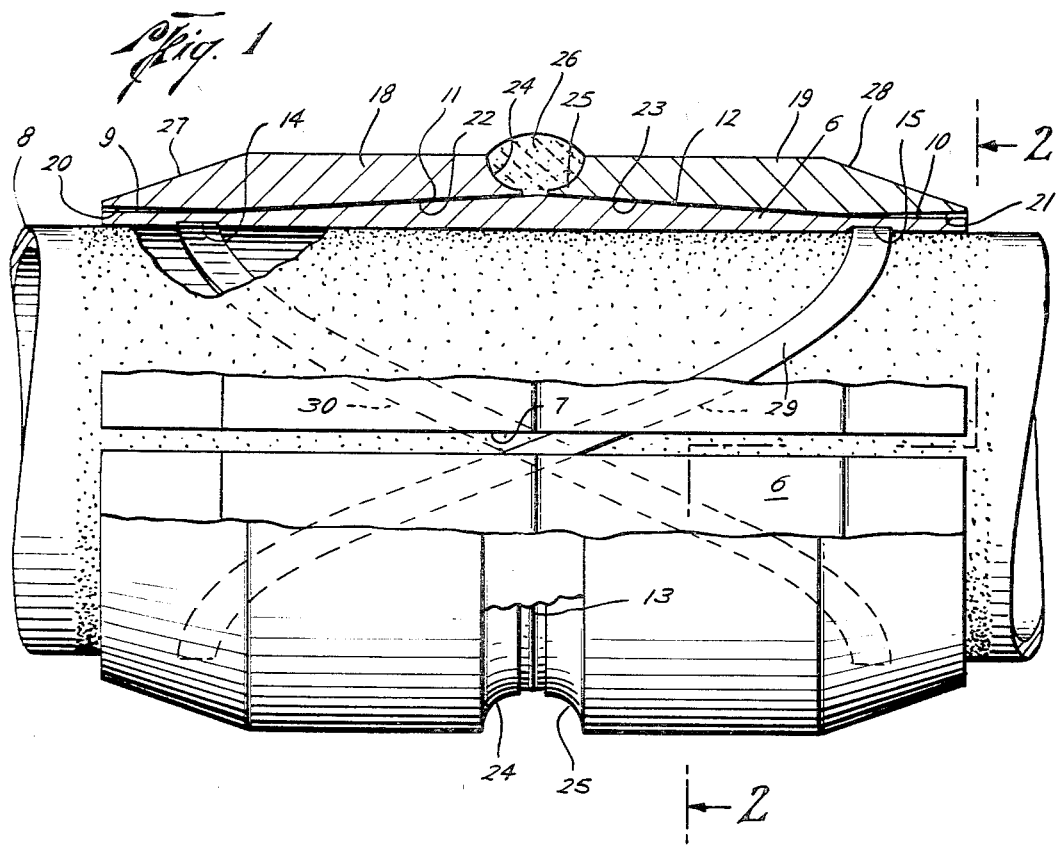
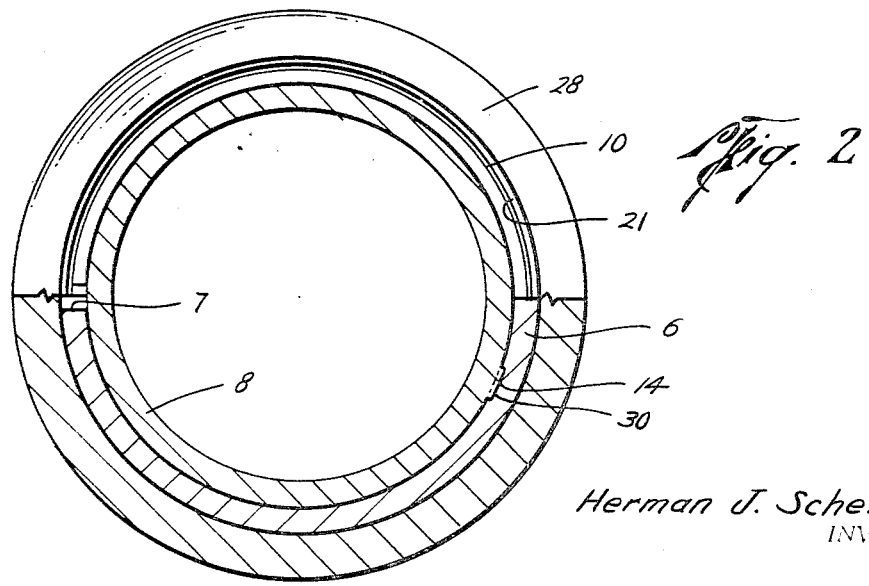

3,411,837
Patented Nov. 19, 1968

3,411,837
DRILL PIPE PROTECTOR
Herman J. Schellstede, Houma, La., assignor to Sparta Industries, Incorporated, Houma, La., a corporation of Louisiana
Filed Nov. 28, 1966, Ser. No. 597,411
2 Claims. (Cl. 308—4)

ABSTRACT OF THE DISCLOSURE

This drill pipe protector consists of a one-piece split sleeve received about an adhesive-coated portion of the drill pipe and having oppositely-inclined tapers on its outer surface wedgingly engaged by a pair of collars which are drawn together by the thermal contraction of a bead of weld metal laid between the ends of the collar. The pipe may be provided with a rib which interlocks with the split sleeve to prevent longitudinal displacement of the protector.

---

This invention relates to drill pipe protectors and consists particularly in an improved protector device and method of securely attaching the same to a drill pipe.

One of the problems with previous drill pipe protectors has been their insecure mountings on the pipe so that they tend to break loose and slide along the pipe to the next lower tool joint or even separate entirely from the pipe and fall into the well. In a copending application Ser. No. 440,026, filed Mar. 15, 1965, in the names of the present inventor and Thomas M. Sanders, there are disclosed and claimed several forms of drill pipe protectors and methods of attaching the same securely to the drill pipe. Those protectors are formed of matching, semi-cylindrical halves which are secured firmly about the drill pipe means of annular beads of weld metal and are adequate for normal usage. However, in cases of excessive and hard usage the securing weld beads may be worn through so as to permit the halves to drop away from the drill stem and into the well annulus with damaging results. Moreover, the protectors covered in the copending application require special equipment for application to a drill pipe, particularly welding equipment not usually found in the plants of tool joint appliers.

Accordingly, an object of the present invention is to provide a drill pipe protector which is exceptionally durable and may be more securely attached to a drill pipe than previous protectors.

Another object is to provide a drill pipe protector which cannot be separated from the drill pipe even after long wear.

These objects and others hereafter appearing are attained substantially in the structure and method in accordance with the present invention and consisting in general of an inner, one-piece, longitudinally split sleeve which is applied endwise upon a section of pipe before the application of the tool joints thereto. A pair of collars are received about the inner sleeve, the sleeve and collars having complementary engaging wedging surfaces. The collars are slightly spaced apart at their adjacent inner edges and are there connected by an annular bead of weld metal which, upon cooling, draws the collars together causing wedging contraction of the split sleeve and firm gripping of the drill pipe thereby. A stop collar may be provided on the pipe if desired to further secure the mounting of the protector thereon.

In the accompanying drawings which illustrate the invention:

FIG. 1 is a partial side elevation and partial vertical longitudinal section illustrating the novel protector, portions being broken away to illustrate the underlying structure;

FIG. 2 is an end view and half vertical transverse section taken substantially on line 2—2 of FIG. 1;

FIG. 3 is in part a side view and in part a vertical transverse section showing the several parts of the protector in the process of being assembled about a drill pipe; and FIG. 4 is a side view of the completed collar anchored on a drill pipe.

The protector consists of an inner sleeve member 6 of mild steel which is split at one side longitudinally as at 7 and of such I.D. as to snugly encompass a drill pipe section 8. One popular size of drill pipe has a nominal O.D. of 4.500 inches, but an O.D. tolerance of as much as ±.031 inch. Consequently, the I.D. of the inner sleeve and the span of split 7 must accommodate expected variations. The external surface of sleeve 6 includes cylindrical terminal portions 9 and 10 and oppositely-tapered intermediate portions 11 and 12 which terminate at the central apex or short cylindrical portion 13. Tapers 11 and 12, preferably, are at about 3° to the pipe axis. The inner surface of sleeve 6 is provided with opposing helical grooves 14 and 15 for a purpose to be described.

Received upon inner sleeve 6 are outer collar or sleeve members 18 and 19 having central bores provided with expanding terminal portions 20 and 21, oppositely-tapered intermediate portions 22 and 23 which are complementary, respectively, to external tapers 11 and 12 on sleeve 6, and quarter circular cut-out corners 24 and 25 at their adjacent inner ends. The purpose of the diverging internal clearance at terminal portions 20 and 21 of the collars is to provide for better stress distribution or fade out between the collars and sleeve 6. Connecting these adjacent inner ends of collars 18 and 19 is an annular bead or ring of weld metal 26 which, in the finished assembly, as shown at 26a in FIG. 4, is machined flush with the exterior surfaces of collars 18 and 19. The exteriors of these collars are generally cylindrical, except for the end portions which are tapered as at 27 and 28. The collars, preferably, are made of hard, wear-resistant material—for instance, 41–37 grade steel.

The drill pipe may be provided with opposed stop ribs, shown helical as at 29 and 30, but which may be circular, or omitted altogether, which are received in previously-mentioned slots 14 and 15 in the inner surface of inner sleeve 6. These ribs may be applied by metal spraying or plating or plasma arc welding as disclosed in the above-mentioned copending application.

The method of assembling the collar with a drill pipe is illustrated in FIG. 3. First, the zone of the pipe to which the protector is to be secured is smoothed by sand blasting and then a layer of epoxy cement is applied thereto, as at 32. Then inner split sleeve 6 is slipped over the plain end of the drill pipe, as at 33, before the application thereto of a tool joint and is lodged upon the epoxy-coated area of the pipe surface. Preferably, the i.d. of inner sleeve 6 is the same as the drill pipe nominal O.D., e.g., 4.5 inches in the case noted above. Thus, split sleeve 6 resiliently grips the pipe. If necessary, sleeve split 6 can be opened by the use of a suitable prying tool to facilitate application of the inner sleeve over epoxy coating 32. After such assembly, a minimum ⅛-inch slot should remain at 7. Where stop ribs are provided on the drill pipe, as at 29 and 30, the inner sleeve will be snapped over these ribs.

After installation of inner sleeve 6, outer collars 18 and 19 are applied over the opposite ends of the pipe and fitted upon the inner sleeve with the outer ends of the sleeve and collars flush and the adjacent inner ends of the collars spaced apart. It is important that the inner tapers 22 and 23 be designed so that the minimum spacing of the inner ends of the collars of approximately ⅛″ will be assured even at minimum O.D. of the drill pipe.

Then, with the pipe mounted on supports as at 35 and 36, clamps, symbolized at 37 and 38, conveniently operated by hydraulic rams, may be applied to the tapered ends 27 and 28 of collars 18 and 19 to press the collars toward each other and upon the wedging tapers 11 and 12 of split sleeve 6 to insure initial snug engagement of the parts. Next, the annular bead of weld metal 26 is laid in the groove between collar ends 24 and 25. A high quality weld must be obtained in order to insure that, upon cooling, the weld metal will adhere to collar ends and draw the collars together. The weld bead preferably will be made from a metal having a higher coefficient of thermal expansion and contaction than the metal of the collars, and stainless steel has proven efficient for this purpose. This contraction, upon cooling of the weld metal causes further wedging action between inner sleeve 6 and the outer collars and further contraction or compression of the inner sleeve into rigid attachment with the drill pipe. To complete the protector, annular bead 26 is machined flush with the outer surfaces of collars 18 and 19, as at 26a, this machining having a tempering effect so that the weld bead forms a wear-resisting reinforcement for the collars 18 and 19. The drill pipe is completed by the butt welding of tool joints on the plain ends of the pipe, as 33, in the usual manner.

Experience has shown that the herein-described protector is unusually durable and rugged and practically lasts the lifetime of the pipe, while protecting the exterior surface of the pipe from abrasion and damaging blows from rocky bore walls. Of course, the protector parts cannot be separated from the drill pipe unless one of the outer collars is completely worn through. Moreover, the equipment and personnel necessary for applying the novel protectors are normally found in the plants of tool joint appliers, so that the drill pipe, either new or renewed, complete with tool joints and protectors may be supplied to the field by concerns usually furnishing the drill pipe alone.

The invention may be modified in various respects as will occur to those skilled in the art, and the exclusive use of all modifications as come within the scope of the appended claims is contemplated.

I claim:
1. A drill pipe protector comprising an inner, one-piece, longitudinally split sleeve internally shaped for snugly fitting upon a drill pipe and having a pair of external tapers extending longitudinally outwardly and radially inwardly toward the ends thereof, a pair of outer collars received on said split sleeve and having inner tapers, respectively, complementary to said external tapers, said complementary tapers being proportioned to provide for an annular space between the adjacent ends of said collars in the assembly, and a bead of weld metal in said space tensionally stressed and urging said outer collars together to produce wedging engagement between said external and internal tapers and radially compressing said inner sleeve and causing the latter to grip the encompassed drill pipe.

2. A drill pipe protector as described in claim 1 further including interfitting stop shoulder and recess means on said inner sleeve and the drill pipe for insuring rigid lodgment of the protector on a pipe.

References Cited

UNITED STATES PATENTS

| | | | |
|---|---|---|---|
| 850,030 | 4/1907 | Mellinger | 287—52.03 |
| 1,377,101 | 3/1921 | Sparling | 287—111 |
| 2,125,324 | 8/1938 | Williams | 285—286 X |
| 2,281,632 | 5/1942 | Steps. | |
| 2,525,703 | 10/1950 | McGirr | 287—111 X |
| 2,671,641 | 3/1954 | Hinkle. | |
| 2,711,912 | 6/1955 | Boice | 29—447 X |
| 2,855,224 | 10/1958 | Boice | 285—286 X |
| 2,877,062 | 3/1959 | Hall. | |
| 3,262,188 | 7/1966 | Briegel | 29—463 X |
| 3,276,824 | 10/1966 | Carter. | |
| 3,360,846 | 1/1968 | Schellstede. | |

FOREIGN PATENTS 623,430  7/1961  Canada.

MARTIN P. SCHWADRON, *Primary Examiner.*

L. L. JOHNSON, *Assistant Examiner.*